United States Patent
Seo et al.

(10) Patent No.: US 9,888,459 B2
(45) Date of Patent: Feb. 6, 2018

(54) SCHEDULING METHOD FOR INTER-TERMINAL DIRECT COMMUNICATION IN WIRELESS COMMUNICATION SYSTEM, AND DEVICE FOR SAME

(71) Applicant: LG ELECTRONICS INC., Seoul (KR)

(72) Inventors: Hanbyul Seo, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 2 days.

(21) Appl. No.: 14/650,804

(22) PCT Filed: Dec. 3, 2013

(86) PCT No.: PCT/KR2013/011100
§ 371 (c)(1),
(2) Date: Jun. 9, 2015

(87) PCT Pub. No.: WO2014/092370
PCT Pub. Date: Jun. 19, 2014

(65) Prior Publication Data
US 2015/0319745 A1    Nov. 5, 2015

Related U.S. Application Data

(60) Provisional application No. 61/737,108, filed on Dec. 14, 2012, provisional application No. 61/749,372, (Continued)

(51) Int. Cl.
*H04W 4/00* (2009.01)
*H04L 12/28* (2006.01)
(Continued)

(52) U.S. Cl.
CPC ....... *H04W 72/0406* (2013.01); *H04W 48/12* (2013.01); *H04W 72/1278* (2013.01);
(Continued)

(58) Field of Classification Search
CPC ............ H04W 72/0406; H04W 48/12; H04W 72/1278; H04W 76/023; H04W 74/0833; H04W 88/02
See application file for complete search history.

(56) References Cited

U.S. PATENT DOCUMENTS

2007/0109989 A1   5/2007   Nakagawa et al.
2011/0223953 A1   9/2011   Lee et al.
(Continued)

FOREIGN PATENT DOCUMENTS

CN   102334370 A    1/2012
KR   10-2006-0098360 A   9/2006
(Continued)

*Primary Examiner* — Lonnie Sweet
(74) *Attorney, Agent, or Firm* — Birch, Stewart, Kolasch & Birch, LLP

(57) ABSTRACT

Disclosed in the present application is a method for a terminal to perform inter-terminal direct communication in a wireless communication system. Specifically, the method comprises: a step for receiving, in a random access phase, random access signals from at least one counterpart terminal; and a step, in a resource allocation phase, for using information for scheduling included in the random access signals to allocate resources for the at least one counterpart terminal, and then transmitting the information of the allocated resources to the at least one counterpart terminal, wherein one time unit for inter-terminal direct communication comprises the random access phase, the resource allocation phase, and a phase for the implementation of inter-terminal direct communication.

12 Claims, 11 Drawing Sheets

Related U.S. Application Data filed on Jan. 6, 2013, provisional application No. 61/894,381, filed on Oct. 22, 2013.

(51) Int. Cl.
*H04L 12/56* (2006.01)
*H04W 72/04* (2009.01)
*H04W 76/02* (2009.01)
*H04W 48/12* (2009.01)
*H04W 72/12* (2009.01)
*H04W 74/08* (2009.01)
*H04W 88/02* (2009.01)

(52) U.S. Cl.
CPC ...... *H04W 76/023* (2013.01); *H04W 74/0833* (2013.01); *H04W 88/02* (2013.01)

(56) References Cited

U.S. PATENT DOCUMENTS

| | | | |
|---|---|---|---|
| 2011/0268004 A1* | 11/2011 | Doppler | H04W 72/02 370/311 |
| 2011/0317569 A1* | 12/2011 | Kneckt | H04L 5/00 370/252 |
| 2012/0093098 A1* | 4/2012 | Charbit | H04W 72/04 370/329 |
| 2012/0163278 A1 | 6/2012 | Chang et al. | |
| 2012/0281679 A1 | 11/2012 | Fan et al. | |
| 2013/0150061 A1* | 6/2013 | Shin | H04W 4/005 455/450 |
| 2013/0225184 A1* | 8/2013 | Liu | H04W 72/042 455/450 |
| 2014/0036876 A1* | 2/2014 | Li | H04W 24/04 370/336 |
| 2014/0064263 A1* | 3/2014 | Cheng | H04W 8/005 370/350 |
| 2014/0185530 A1* | 7/2014 | Kuchibhotla | H04W 76/023 370/329 |

FOREIGN PATENT DOCUMENTS

| | | |
|---|---|---|
| KR | 10-2010-0115676 A | 10/2010 |
| KR | 10-2011-0103852 A | 9/2011 |
| KR | 10-2012-0073147 A | 7/2012 |
| WO | WO 2012/128505 A2 | 9/2012 |

\* cited by examiner

FIG. 2
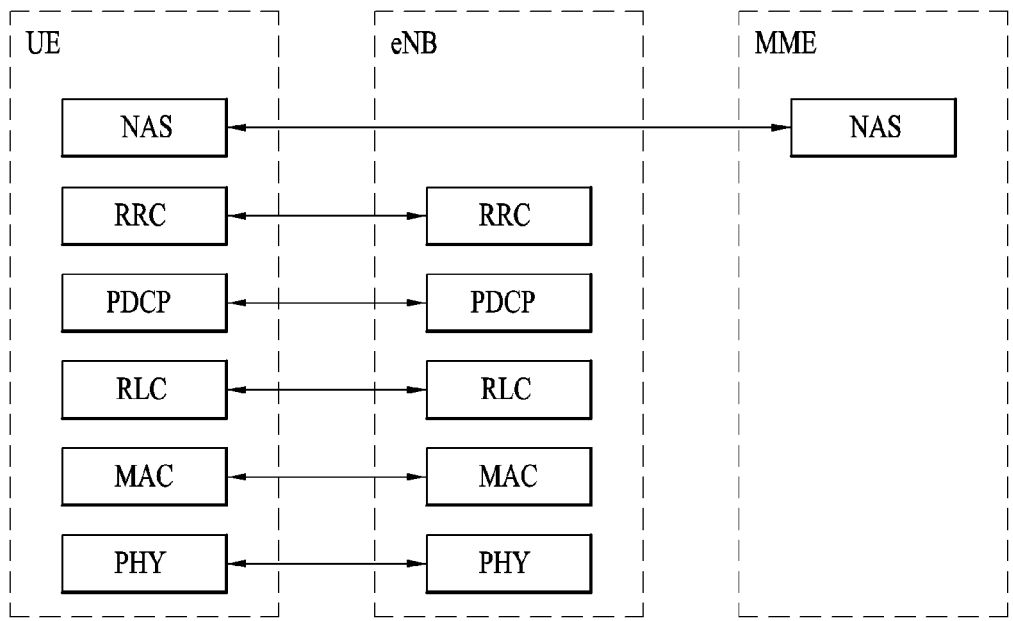
(a) Control - Plane Protocol Stack
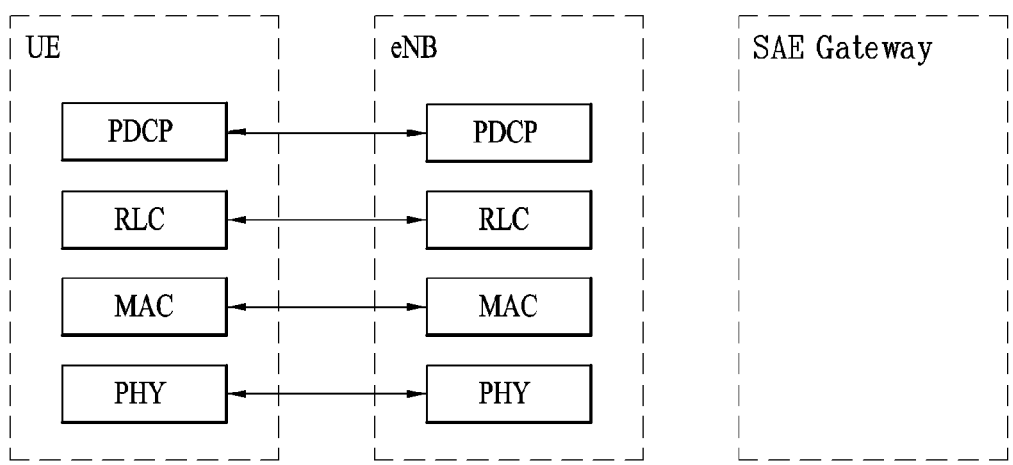
(b) User - Plane Protocol Stack

SCHEDULING METHOD FOR INTER-TERMINAL DIRECT COMMUNICATION IN WIRELESS COMMUNICATION SYSTEM, AND DEVICE FOR SAME

CROSS REFERENCE TO RELATED APPLICATIONS

This application is the National Phase of PCT International Application No. PCT/KR2013/011100, filed on Dec. 3, 2013, which claims priority under 35 U.S.C. 119(e) to U.S. Provisional Application No. 61/737,108, filed on Dec. 14, 2012, 61/749,372, filed on Jan. 6, 2013 and 61/894,381, filed on Oct. 22, 2013, all of which are hereby expressly incorporated by reference into the present application.

TECHNICAL FIELD

The present invention relates to a wireless communication system and, more particularly, a scheduling method for device-to-device (D2D) communication in a wireless communication system, and an apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An object of the present invention devised to solve the problem lies in a scheduling method for device-to-device (D2D) communication in a wireless communication system, and an apparatus therefor.

Technical Solution

The object of the present invention can be achieved by providing a method for performing device-to-device (D2D) communication by a user equipment (UE) in a wireless communication system, the method including receiving random access signals from one or more peer UEs in a random access period, and allocating resources for the peer UEs using scheduling information included in the random access signals and transmitting information about the allocated resources to the peer UEs in a resource allocation period, wherein one time unit for the D2D communication includes the random access period, the resource allocation period, and a period for performing the D2D communication.

Here, the method may further include transmitting a reference signal for performing the D2D communication, and the UE may transmit the reference signal prior to the peer UEs. In addition, the transmitting of the information about the allocated resources to the peer UEs may include repeatedly transmitting the random access signals received from the peer UEs.

Preferably, the random access signals may be generated based on at least one of UE identifiers (IDs) of the peer UEs, the amounts of traffic to be transmitted by the peer UEs through the D2D communication, and UE identifiers of target UEs of the D2D communication.

Additionally, the random access period may be divided into a plurality of random access sub-periods, and each of the peer UEs may transmit the random access signal in a corresponding random access sub-period.

More preferably, one time unit for the D2D communication may include a period in which the D2D communication is interrupted.

In another aspect of the present invention, provided herein is a user equipment (UE) for performing device-to-device (D2D) communication in a wireless communication system, the UE including a radio frequency (RF) module for transmitting and receiving signals to and from a base station (BS) or one or more peer UEs, and a processor for processing the signals, wherein the processor controls the RF module to receive random access signals from the peer UEs in a random access period, and to allocate resources for the peer UEs using scheduling information included in the random access signals and transmit information about the allocated resources to the peer UEs in a resource allocation period.

Advantageous Effects

According to an embodiment of the present invention, scheduling for device-to-device (D2D) communication in a wireless communication system may be performed more efficiently.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.

BEST MODE

Figure 1:
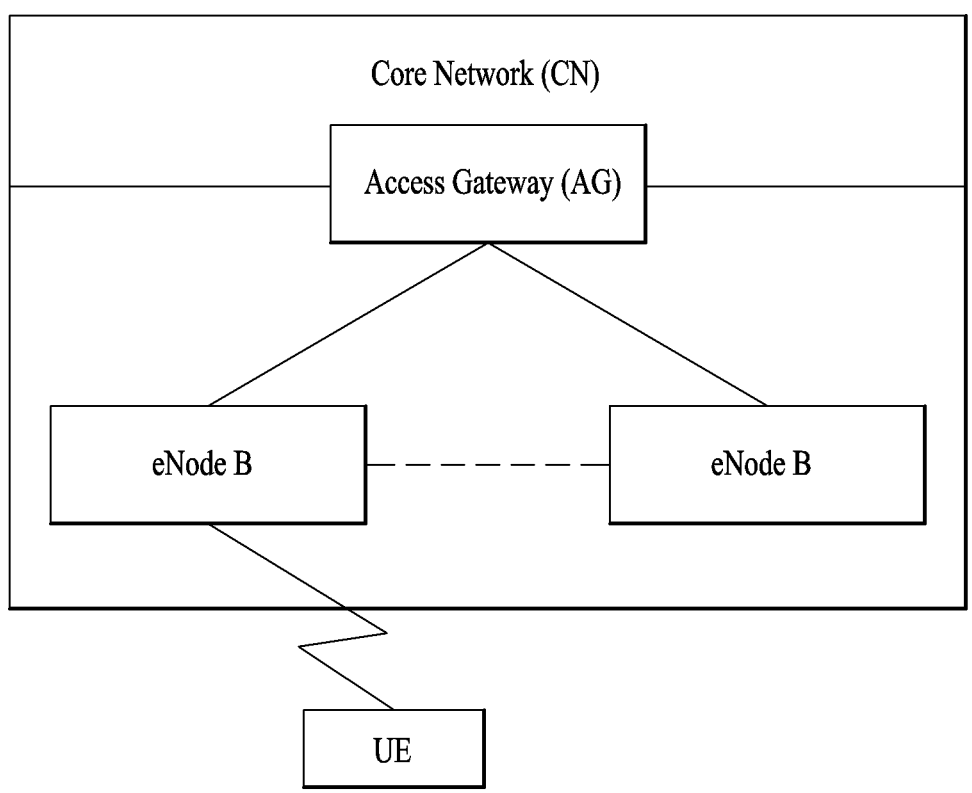
FIG. 1 is a diagram showing a network structure of an Evolved Universal Mobile Telecommunications System (E-UMTS) as an example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
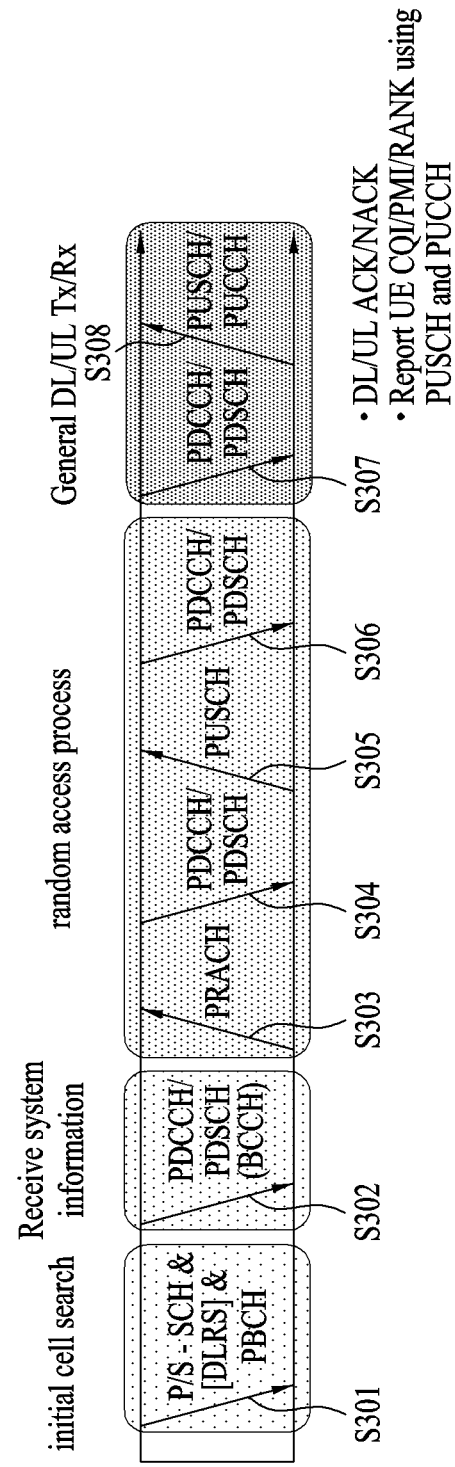
FIG. 3 is a diagram showing physical channels used in a 3GPP system and a general signal transmission method using the same.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
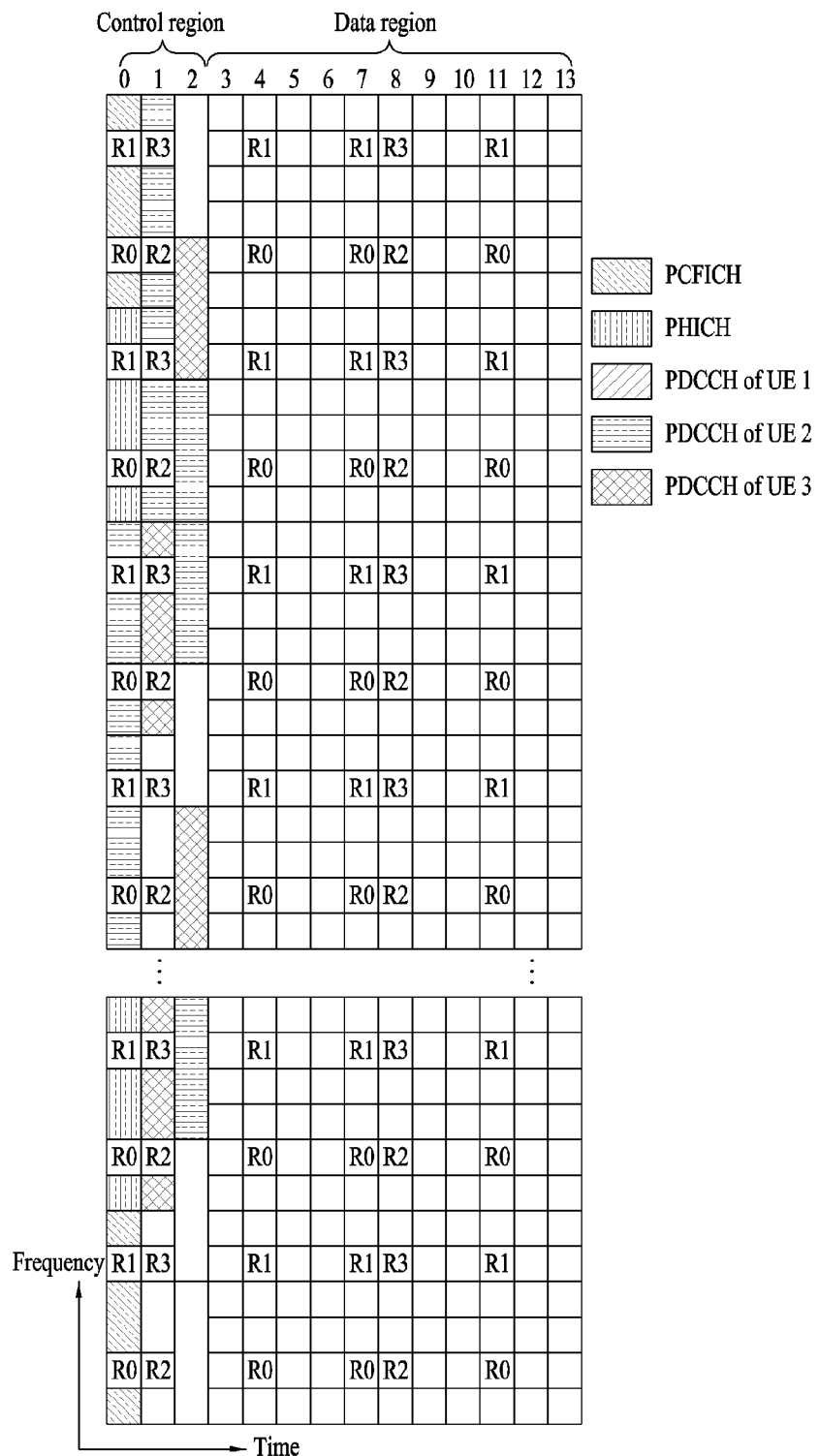
FIG. 4 is a diagram showing the structure of a downlink radio frame used in a Long Term Evolution (LTE) system.

FIG. 4 illustrates exemplary control channels included in a control region of a subframe in a DL radio frame.

Figure 5:
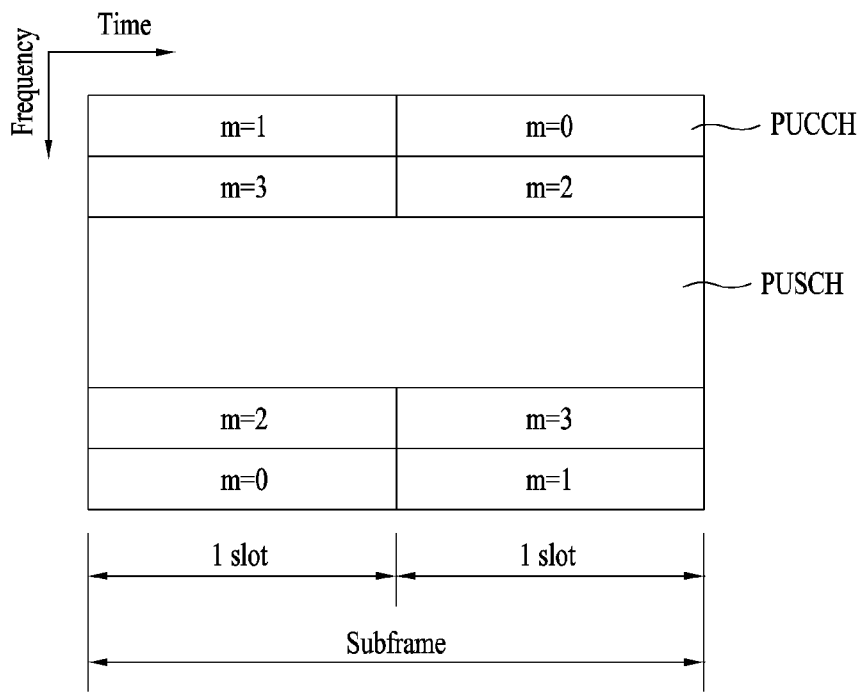
FIG. 5 is a diagram showing the structure of an uplink subframe used in an LTE system.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

A basic resource unit of a DL control channel is an REG. The REG includes four contiguous REs except for REs carrying RSs. A PCFICH and a PHICH include 4 REGs and 3 REGs, respectively. A PDCCH is configured in units of a Control Channel Element (CCE), each CCE including 9 REGs.

FIG. 5 illustrates a structure of a UL subframe in the LTE system.

Referring to FIG. 5, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 5.

Figure 6:
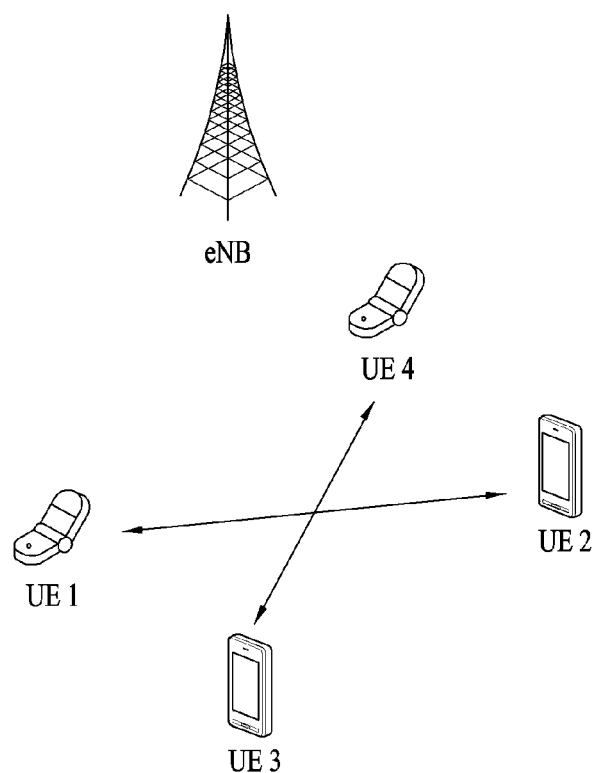
FIG. 6 is a diagram illustrating the concept of device-to-device (D2D) communication.

FIG. 6 is a diagram illustrating the concept of device-to-device (D2D) communication.

Referring to FIG. 6, UE1 and UE2 perform direct communication therebetween, and UE3 and UE4 also perform direct communication therebetween. An eNB may use an appropriate control signal to control the location of time/frequency resources, Tx power, etc. for direct communication between UEs. However, when some UEs are located outside the coverage of the eNB, direct communication between the UEs may be configured to be performed without a control signal of the eNB. Direct communication between UEs is referred to as device-to-device (D2D) communication in the following description.

Meanwhile, if UEs are located within the coverage of the eNB, the eNB may directly schedule D2D links between the UEs. That is, the eNB may give an indication about when, to which UE, and using which frequency resource and how much Tx power each UE transmits a D2D signal, through explicit signaling. Otherwise, if UEs located outside the coverage of the eNB perform D2D communication, an entity capable of managing all D2D links, e.g., the eNB, is not present, scheduling of the D2D links may not be easy.

To solve this problem, the present invention proposes a method for scheduling D2D links between adjacent UEs by a specific UE. Here, a set of D2D UEs scheduled by one UE may be referred to as a UE cluster. Although the following embodiments describe a case in which the D2D UEs are located outside the coverage of the eNB, even when the D2D UEs are located within the coverage of the eNB, the proposed method may also be used to reduce signaling overhead for scheduling individual D2D links by the eNB.

When the D2D UEs are located within the coverage of the eNB, the eNB may transmit an indicator indicating whether the UE should schedule the UE cluster or the eNB directly schedules D2D links. That is, the method for scheduling other D2D UEs by a UE is basically used if the UE is located outside the coverage of the eNB, but whether to use the method for scheduling other D2D UEs by a UE is determined based on an indication of the eNB if the UE is located within the coverage of the eNB.

The UE may be determined to be located outside the coverage of the eNB, for example, if a primary synchronization signal (PSS)/secondary synchronization signal (SSS) transmitted by the eNB is not detected in a specific carrier, or if the maximum reference signal received power (RSRP) or/and reference signal received quality (RSRQ) measured in the specific carrier is equal to or less than a certain reference value. Here, the specific carrier may be a DL carrier to be used for D2D communication if the D2D communication is performed in the DL carrier of an FDD system, or a DL carrier paired with a UL carrier to be used for D2D communication if the D2D communication is performed in the UL carrier of the FDD system. Alternatively, to restrict the D2D link scheduling operation by the UE to a case in which connection to the eNB cannot be established in any carrier, the basis of determination may be changed to a case in which the UE satisfies the above condition in all receivable carriers.

Initially, to allow a specific UE to schedule an adjacent UE cluster, one scheduling UE should be selected in the UE cluster. As an example of the method for selecting the scheduling UE, a method for stochastically transmitting a predetermined reference signal by each UE in the cluster and selecting a UE which has first succeeded in transmitting the reference signal, as the scheduling UE may be considered.

The method for stochastically transmitting the reference signal uses, 1) a method for generating a random number every candidate location for transmission based on a certain rule to determine whether to stochastically transmit the reference signal, and transmitting the reference signal if the generated number is greater (or less) than a reference value determined based on a given transmission probability, or 2) a method for generating and storing a random number at an initial candidate location based on a certain rule, repeating an operation for subtracting a certain number from the stored value and then storing the subtracted value if no reference signal is transmitted at each candidate location, and transmitting the reference signal if the stored value is less than or equal to a certain reference. In particular, when the random number is generated in the method 2), the random number may be configured to be present between a certain minimum value and a certain maximum value. Here, the candidate location refers to a location having a possibility of transmitting the reference signal among a certain number of locations divided from a time unit defined for D2D communication.

UEs having successfully detected the reference signal transmitted by the scheduling UE form one UE cluster, and perform D2D communication using resources allocated by the scheduling UE. In this case, the reference signal transmitted by the scheduling UE may provide basic information about scheduling in the UE cluster. Specifically, the UEs in the cluster may check the boundary of a subframe in which every D2D signal is transmitted, based on the reference signal.

In the above-described stochastic reference signal transmission method, a different reference signal transmission priority may be given based on the type of a UE performing D2D communication. For example, UEs capable of performing D2D communication may be subdivided into a few types based on the maximum Tx power of the D2D signal (where the maximum Tx power is the maximum D2D signal Tx power which is implemented in each UE or the maximum Tx power of the D2D signal which is restricted by an indication of the eNB or through a D2D transmission control process at a current timing), capability of D2D group communication, capability of controlling another D2D link, etc. Here, D2D group communication refers to D2D communication performed by one UE simultaneously with a plurality of other UEs, and the capability of controlling another D2D link refers to capability of performing control such as resource allocation on an adjacent D2D link not connected to a corresponding UE.

In addition, different priorities may be given even to UEs having the same function, based on identifiers (IDs) preliminarily provided to the UEs. In particular, this method may be effective when a sort of layer structure is formed between users and thus a larger number of communication opportunities of a specific user compared to other users is advantageous, because the scheduling UE may achieve resource allocation without competing with other UEs but UEs other than the scheduling UE are possibly excluded from resource allocation in a random access process due to collision with other UEs.

For example, a whole region of UE IDs for D2D communication is divided into a plurality of regions, different reference signal transmission priorities are given to the regions, and an ID of a region having a higher priority is given to a UE required to have a larger number of communication opportunities. Similarly, a UE may have a different reference signal transmission priority based on the amount of traffic to be transmitted using D2D communication, which is accumulated in a buffer. Preferably, a UE having a larger amount of traffic may have a higher priority (i.e., a higher reference signal transmission probability).

After the scheduling UE is selected, each UE in the cluster should signal information indicating whether the UE needs resource allocation for D2D communication and various types of information required for scheduling if resource allocation is needed, to the scheduling UE. To this end, each UE in the cluster attempts random access to the scheduling UE using a designated time/frequency resource. Here, the random access attempt means that each UE in the cluster transmits a signature of a certain sequence based on a predetermined rule, and whether to select the signature and whether to transmit the same at each candidate timing are stochastically determined based on random number generation. As a special case of random access, when a specific UE should transmit a specific signature at a specific timing, the probability of selecting and the probability of transmitting the corresponding signature may be set to 1 at the corresponding timing.

A plurality of signatures may be used for transmission by the UE in a general random access process, and may be generated by varying an initial value when a pseudo random sequence of the same structure is generated, or by varying a cyclic shift value in the same sequence. Specifically, the random access signature may have a form of PRACH preamble, DM-RS, SRS, PSS, or SSS defined for the legacy LTE system or have a form of a UE discovery signal used to determine whether a D2D UE is adjacent. Here, the UE discovery signal refers to a series of signals generated and transmitted based on UE ID when a specific D2D UE signals adjacency thereof to other D2D UEs. A UE which needs resource allocation for a D2D link attempts random access by stochastically selecting the plurality of signatures given as described above, and whether to transmit the signature at each transmission timing may also be stochastically determined using, for example, the above reference signal transmission method 1) or 2).

Additionally, the random access signature may be selected based on specific information and the scheduling UE may detect the signature and acquire the corresponding information. This operation may enable more efficient resource allocation of the scheduling UE. Here, examples of the specific information used to select a random access signature may include information (1) to information (3) as described below.

(1) An example of the specific information used to select a random access signature is the amount of traffic to be transmitted through D2D communication by the UE performing random access. That is, all random access signatures may be divided into a plurality of sets, and a set including the signature selected by the UE is selected differently based on the amount of traffic to be transmitted. Specifically, after all signatures are divided into 4 sets, a signature to be used for random access is selected from set 1 if the amount of traffic is greater than reference 1, selected from set 2 if the amount of traffic is less than reference 1 but greater than reference 2, selected from set 3 if the amount of traffic is less than reference 2 but greater than reference 3, and selected from set 4 if the amount of traffic is less than reference 3. Preferably, each set may include two or more different random access signatures, and UEs having the same amount of traffic may select the same set but may attempt random access using different signatures.

Additionally, Tx power used to transmit the random access signature may also be determined based on the amount of traffic. Specifically, by allowing a UE having a larger amount of traffic to transmit a signature with higher power, the signature of the UE having a larger amount of traffic may be preferentially detected when colliding with a signature of a UE having a smaller amount of traffic. To this end, the Tx power of the random access signature may be configured in proportion to the amount of traffic to be transmitted.

(2) Another example of the information used to select a random access signature is an ID of a receiving UE with which the UE performing random access desires to perform D2D communication. That is, an ID of a specific receiving UE may be connected to a specific random access signature, and the scheduling UE may receive the corresponding signature and acquire information indicating a UE with which the UE having transmitted the signature requests D2D communication.

In particular, since the number of random access signatures is generally less than a total number of UE IDs, a plurality of UE IDs may be connected to one random access signature. This means that, when a specific signature is received, the scheduling UE may acquire information indicating a set of IDs of UEs capable of serving as the receiving UE, but may not acquire exact information indicating an ID of a UE to be served as the receiving UE. In addition, one receiving UE ID may be connected to a plurality of signatures to prevent collision in signature transmission caused when a plurality of D2D UEs which desire to transmit signals to the same UE always select the same signature.

In other words, when a specific D2D UE transmits a random access signature to the scheduling UE to transmit a D2D signal to a specific receiving UE, the D2D UE attempts random access by stochastically selecting one of a series of random access signatures connected to an ID of the receiving UE.

Additionally, the UE which desires to transmit a D2D signal to a specific receiving UE may directly transmit a UE discovery signal formed from an ID of the receiving UE to directly signal information indicating a UE to which transmission of the D2D signal is desired (or indicating that transmission of the D2D signal to the receiving UE is desired), to the scheduling UE (or the receiving UE) having detected the UE discovery signal.

(3) Another example of the specific information used to select a random access signature is an ID of a transmitting UE performing random access. Similarly to the selecting of one of the signatures connected to the ID of the receiving UE, the transmitting UE may perform random access by selecting one of signatures connected to the transmitting UE.

Alternatively, a random access signature may be selected using a combination of the above-described information (1) to information (3). That is, a combination of an ID of a specific transmitting UE and an ID of a specific receiving UE may be connected to a series of random access signatures, and the transmitting UE which desires to transmit a signal to the receiving UE may stochastically select one of the connected signatures.

Although the above description is given of a method for transmitting certain information by selecting a random access signature, the same principle may also be applied to a method for transmitting information by selecting a time or frequency region for transmitting a random access signature.

Figure 7:
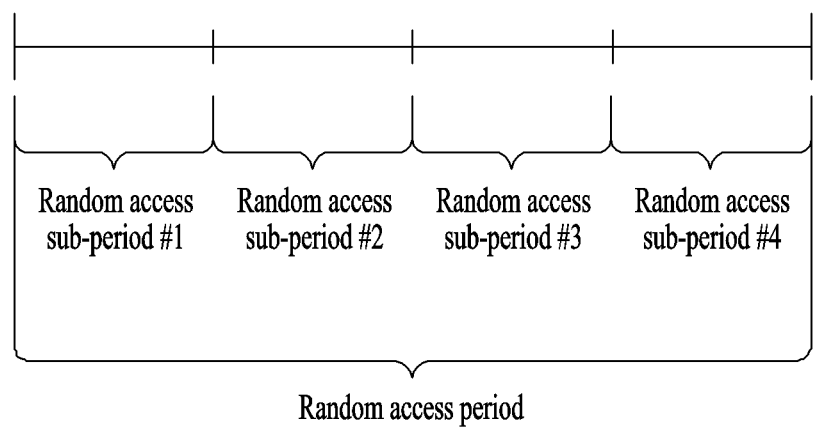
FIG. 7 illustrates an example of dividing a time region for performing random access by UEs in a cluster, into a plurality of sub-periods according to an embodiment of the present invention.

FIG. 7 illustrates an example of dividing a time region for performing random access by UEs in a cluster, into a plurality of sub-periods according to an embodiment of the present invention.

Referring to FIG. 7, information indicating the amount of traffic to be transmitted through a D2D link or D2D communication, an ID of a receiving UE, an ID of a transmitting UE, or a combination thereof may be provided to a scheduling UE by selecting a sub-period for transmitting a random access signature. FIG. 7 illustrates an example in which a given random access period is divided into four sub-periods, and a different sub-period is selected based on the above-described information.

Meanwhile, to allow a UE located between two clusters to distinguish between random access signatures transmitted from the two clusters, UEs belonging to different clusters preferably use distinguishable random access signatures.

For example, an ID value of a cluster may be used as a seed value of a random access signature, and thus the UE may receive the random access signature and acquire information indicating a cluster in which the random access signature is valid. That is, when a signature not generated based on the ID of the cluster to which the UE belongs is detected, the UE may regard that the signature is irrelevant to scheduling in the cluster to which the UE currently belongs, and regard that a scheduling request in associated resources is not generated in the cluster to which the UE currently belongs.

Alternatively, to avoid complicated operation for detecting an excessive number of random access signatures, the UE may attempt to detect only signatures generated based on the ID of the cluster to which the UE currently belongs. To this end, the scheduling UE may signal an ID of the cluster using a reference signal transmitted when the UE is selected as the scheduling UE.

If this scheduling operation is performed within the coverage of the eNB, the scheduling UE may not be present. In this case, the eNB may give an indication of an ID value of a cluster to be used to generate random access signatures. In particular, the operation for designating the cluster ID by the eNB and generating the random access signatures using the same by the UEs may be effective in that random access signatures of different clusters may be distinguished when a plurality of UE clusters are present within the coverage of the same eNB or when one UE cluster is located over the coverage of a plurality of eNBs. The ID value of the cluster to be used to generate random access signatures, which is indicated by the eNB, may have a different value from a cell ID of the eNB and thus clusters of different IDs may coexist within the coverage of the same eNB.

Meanwhile, the scheduling UE may also desire to transmit a D2D signal to another UE. In this case, the scheduling UE may perform scheduling by combining information thereof with random access results of other UEs in the cluster on the assumption that the above-described random access process has been virtually attempted and the attempt is successful. For example, when the scheduling UE receives random access signatures of UEs n (n=1, . . . , N) requesting allocation of b(n) resources (one of the UEs n may be the scheduling UE), the scheduling UE may perform scheduling in proportion to the b(n) resources requested by the UEs n.

That is, if all resources schedulable at a time are given as K units, $$\frac{K*b(n)}{\sum_{m=1}^{N} b(m)}$$

resource units are allocated to the UEs n. If resource allocation to a single UE is restricted to integer units, the number of units allocated to the UEs n may be given in the form of $$\left\lfloor \frac{K*b(n)}{\sum_{m=1}^{N} b(m)} \right\rfloor.$$

Here, the function $\lfloor x \rfloor$ the maximum integer less than or equal to x.

After the $$\left\lfloor \frac{K*b(n)}{\sum_{m=1}^{N} b(m)} \right\rfloor$$

units are allocated to the UEs n, some resource units may remain due to operation of the function $\lfloor x \rfloor$. These remaining resource units may be further allocated to some UEs through an additional allocation process. As an example of the additional allocation process, the remaining resource units may be allocated one-by-one in the order of UE indexes until the remaining resource units are all allocated. Otherwise, a UE to which each of the remaining resource units is to be reallocated may be arbitrarily selected to prevent a UE of a specific index from being repeatedly selected as a preferential target of resource reallocation.

Alternatively, without assuming that resource allocation is restricted to integer units, the priority of additional allocation may be configured based on the difference between the number of resources $$\frac{K*b(n)}{\sum_{m=1}^{N} b(m)}$$

to be allocated to the UEs n and the number of primarily allocated resources $$\left\lceil \frac{K*b(n)}{\sum_{m=1}^{N} b(m)} \right\rceil.$$

For example, the remaining resource units may be additionally allocated one-by-one in the order of a UE having a large difference between $$\frac{K*b(n)}{\sum_{m=1}^{N} b(m)} \text{ and } \left\lceil \frac{K*b(n)}{\sum_{m=1}^{N} b(m)} \right\rceil.$$

In this case, if a plurality of UEs have the same priority, the priority may be additionally given based on a UE index or an arbitrarily selected order.

The resource unit in the above resource allocation may be a certain time resource unit such as a subframe, a certain frequency resource unit such as a physical resource block (PRB), or a combination thereof.

If the scheduling UE determines the number of resources to be allocated to each UE through the above-described process, the scheduling UE should signal a result thereof to the UEs in the cluster. The scheduling UE may transmit this scheduling result at a pre-designated time/frequency location, preferably, from a timing after a predetermined time from a timing at which the random access period is terminated.

In general, when one UE schedules one cluster, the scheduling UE may not easily acquire, for example, channel information of each D2D link in detail. As such, scheduling itself should be preferably simplified. For example, the scheduling UE may only determine a D2D link to which every transmission timing is allocated, and resources of the frequency region may be used by a D2D link to which all frequencies at the corresponding timing are allocated. In addition, modulation and coding scheme (MCS) or Tx power control, HARQ operation, etc. of each D2D link may be autonomously performed by UEs belonging to the D2D link using resources allocated by the scheduling UE. In this sense, the scheduling UE may perform only partial scheduling for designating the locations of resources to be used by different UEs.

In addition, since the scheduling UE performs scheduling based on information received from the UEs in the cluster through the random access process, a scheduling message may be configured in the form of information indicating which resource unit is allocated to a UE having transmitted which random access signature. That is, if a specific UE has transmitted a specific random access signature at a specific location, the UE acquires information indicating a resource allocated to the corresponding location/signature, based on scheduling information transmitted by the scheduling UE, and performs D2D communication using the allocated resource. In the following description, allocation of a specific resource unit to a specific UE performing D2D communication means that the corresponding resource unit is connected to a location/signature transmitted by the corresponding UE in the scheduling information transmitted by the scheduling UE.

As a specific example of transmitting the scheduling information, the scheduling UE may transmit a list of indexes of UEs to which the resource units are individually allocated. That is, if K resource units are allocated, the scheduling information includes a list of K UE indexes, and an n-th resource unit is allocated to a UE corresponding to an n-th UE index of the list. As described above, the list of the K UE indexes may include information about K random access signatures (e.g., initial values, transmission locations, etc. of the signatures), and may be encoded as one codeword and transmitted via a physical channel. Alternatively, the scheduling UE may divide a period for transmitting the scheduling information into K sub-periods, and a random access signature corresponding to a UE index to which an n-th resource unit is allocated may be transmitted in an n-th sub-period.

Figure 8:
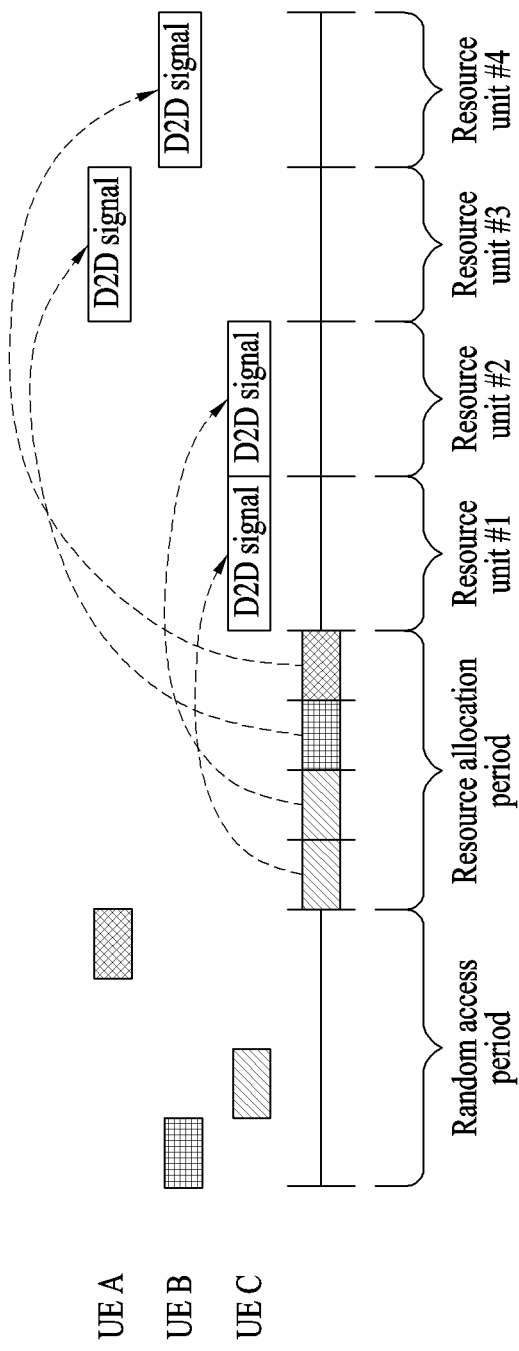
FIG. 8 illustrates an example of performing resource allocation for D2D communication and performing D2D communication based on the resource allocation according to an embodiment of the present invention.

FIG. 8 illustrates an example of performing resource allocation for D2D communication and performing D2D communication based on the resource allocation according to an embodiment of the present invention.

Referring to FIG. 8, UE A, UE B, and UE C perform random access using different signatures and then receive resource allocation information. In particular, since a total of 4 resource allocation units are scheduled using one piece of resource allocation information in FIG. 8, a resource allocation period is divided into 4 sub-periods and each UE determines whether the signature transmitted by the UE is detected in each sub-period. If the signature transmitted by the UE is detected, the UE determines that a resource unit corresponding to the sub-period is allocated to the UE, and performs D2D communication. Resource unit #1 and resource unit #2 are allocated to UE C, resource unit #3 is allocated to UE A, and resource unit #4 is allocated to UE B in FIG. 8.

Additionally, in the scheduling information transmission operation of FIG. 8, if the scheduling UE receives equal random access signatures at different timings of a random access period, the scheduling UE may not easily distinguish between these random access signatures. Accordingly, the random access period may be divided into a plurality of sub-periods and a set of random access signatures used in each sub-period may be configured differently from that used in another sub-period.

According to the above-described scheduling information transmission method, when a UE which attempts D2D communication performs random access, if the UE determines a signature and a transmission location thereof based on an ID of a receiving UE, the receiving UE may preliminarily acquire information indicating an individual resource unit in which a D2D signal directed to the receiving UE is possibly transmitted. That is, if the receiving UE of the D2D signal knows that a random access signature generated from the ID thereof is included in a UE index list of the scheduling information, the receiving UE may be preliminarily prepared to receive the D2D signal using a corresponding resource. Otherwise, if the random access signature is not included in the list, the receiving UE may know that no D2D signal is to be transmitted thereto at least before subsequent resource allocation and may prevent battery consumption by switching off a D2D-related circuit if the receiving UE does not transmit a D2D signal.

Additionally, if a specific receiving UE has detected, in the random access period, a random access signature generated from an ID thereof and/or an ID of a transmitting UE in which the receiving UE is interested, this means that a specific transmitting UE may possibly transmit a D2D signal to the receiving UE using a subsequent resource for D2D communication. As such, the receiving UE may be prepared to receive the D2D signal in a resource which can be associated with the corresponding random access period. Otherwise, if the receiving UE has not detected, in the random access period, a random access signature generated from an ID thereof and/or an ID of a transmitting UE in which the receiving UE is interested, this means that the receiving UE may acquire information indicating no D2D signal transmission in associated resources.

As a modification of the method described in relation to FIG. 8, the scheduling information transmitted in the resource allocation period may have a form of repeating the random access signatures received by the scheduling UE in the random access period, to reduce scheduling complexity of the scheduling UE. In this case, the scheduling UE may merely relay scheduling request information of a plurality of UEs received in the random access period. This method may allow the scheduling UE to relay random access signatures of transmitting UEs to UEs in the cluster which cannot directly receive the random access signatures, and thus may be effective when one scheduling UE covers a large area.

If one scheduling UE covers a small area and thus a random access signature transmitted by an arbitrary UE can be received by all UEs, this resource allocation operation of the scheduling UE may be omitted and each UE may detect the random access signature of the random access period to acquire information indicating when a D2D signal is to be transmitted. In this case, the resource allocation period may be omitted for resource efficiency. In another sense, the random access period may be omitted and each UE may directly transmit a random access signature in a specific region of the resource allocation period.

Meanwhile, when scheduling for D2D communication is performed according to the present invention, specific D2D communication should be received by all UEs in some cases. For example, when a specific UE desires to transmit the same information simultaneously to all UEs in the cluster, the information transmitted by the corresponding UE should be configured to be received by all UEs. To this end, when random access is performed, a specific transmission location or signature may be allocated to the D2D communication which should be received by all UEs, and thus a UE which desires to transmit a signal which should be received by all UEs may perform random access using the corresponding location/signature.

In addition, the scheduling UE may provide a priority in resource allocation to the D2D communication which should be received by all UEs. Request resource units may be preferentially allocated to a resource allocation request for the D2D communication which should be received by all UEs, and then remaining resource units may be allocated to general D2D communication.

Alternatively, the D2D communication which should be received by all UEs may be scheduled to use time resources located in a front part, and thus UEs not scheduled to further receive another D2D signal may prevent battery consumption by switching off a D2D circuit after the corresponding D2D communication is completely received. In addition, when the UEs receive the scheduling information, if the random access signature used for the D2D communication which should be received by all UEs is included in the UE index list, the UEs should receive a D2D signal in a corresponding resource.

Specifically, D2D communication may be classified into a plurality of types based on the size of a receiving UE group. For example, the D2D communication types include a communication type which should be received by all UEs capable of D2D communication (hereinafter referred to as D2D communication type 1), a communication type which should be simultaneously received by a plurality of predetermined UEs (hereinafter referred to as D2D communication type 2), and a communication type which should be received by only a single UE (hereinafter referred to as D2D communication type 3). When these three D2D communication types are mixed, the priority in scheduling may be preferably given in the order of D2D communication type 1, D2D communication type 2, and D2D communication type 3. To this end, locations/signatures of resources used for random access may be divided into at least three types, each of which allocated to a corresponding D2D communication type. In addition, the above-described priority given to each communication type may be preferably given to each resource allocation operation for D2D communication or to each time resource for D2D communication.

These D2D communication types may be divided based on UE IDs. A separate UE ID may be allocated to communication to be received by all UEs or communication to be received by a plurality of UEs belonging to a specific group and thus, if D2D scheduling is performed for the corresponding UE ID, all UEs or the UEs belonging to the group may receive a D2D signal.

A change may occur in the cluster if a certain time has passed. For example, the scheduling UE may move to another location or terminate D2D communication. Accordingly, configuration of the scheduling UE is valid only for a certain time and a process for selecting a scheduling UE should be preferably performed again after the certain time has passed. To prevent inefficiency caused by excessive competition among a large number of UEs in this process, a UE which has served as the scheduling UE may be preferentially selected as a scheduling UE for subsequent scheduling, and the other UEs may compete to be a scheduling UE only if information indicating that the previous scheduling UE continuously desires to perform scheduling is not received within a certain time.

Meanwhile, even when UEs located outside the coverage of the eNB form a UE cluster and perform D2D communication, the UEs should continuously perform an operation for detecting the presence of the eNB because, although the D2D UEs are first located outside the coverage of the eNB when they first form the UE cluster and perform D2D communication, each UE may move into the coverage of the eNB as time passes. If the UE moves into the coverage of the eNB, the UE should be preferably connected to the eNB as soon as possible and receive data from UEs not belonging to the cluster.

However, if a UE should transmit or receive a D2D signal at a timing when the UE detects a signal transmitted from the eNB to detect the presence of the eNB, the D2D signal may serve as strong interference in detecting the eNB signal and thus the UE may not easily detect the presence of the eNB if the UE continuously participate in D2D communication. Accordingly, to allow the UEs performing D2D communication outside the coverage of the eNB, to continuously detect a signal transmitted by the eNB, the present invention now proposes to allocate some time resources as eNB signal detection time resources and to stop transmission and reception of D2D signals in the corresponding time resources using methods A) and B) described below.

A) The scheduling UE may appropriately schedule individual UEs to have a time to detect an eNB signal. Specifically, if it is assumed that a UE requires a continuous time of at least T1 for eNB signal detection and eNB signal detection should be performed at least once within a time period of T2 for sufficient eNB signal detection, the scheduling UE should guarantee in scheduling a specific UE that the corresponding UE does not perform any D2D operation for the continuous time T1 at least once within the time period T2.

For convenience of explanation, a time region in which valid resource allocation is performed for a certain period of time is referred to as one "D2D scheduling period". If the length of the time period T2 is less than or equal to that of one D2D scheduling period, the operation for guaranteeing at least one eNB signal detection operation for at least the time T1 within the time period T2 may be performed every D2D scheduling period. Alternatively, for higher D2D resource allocation, the eNB signal detection operation may be performed at least once within N (=2, 3, . . . ) D2D scheduling periods.

Figure 9:
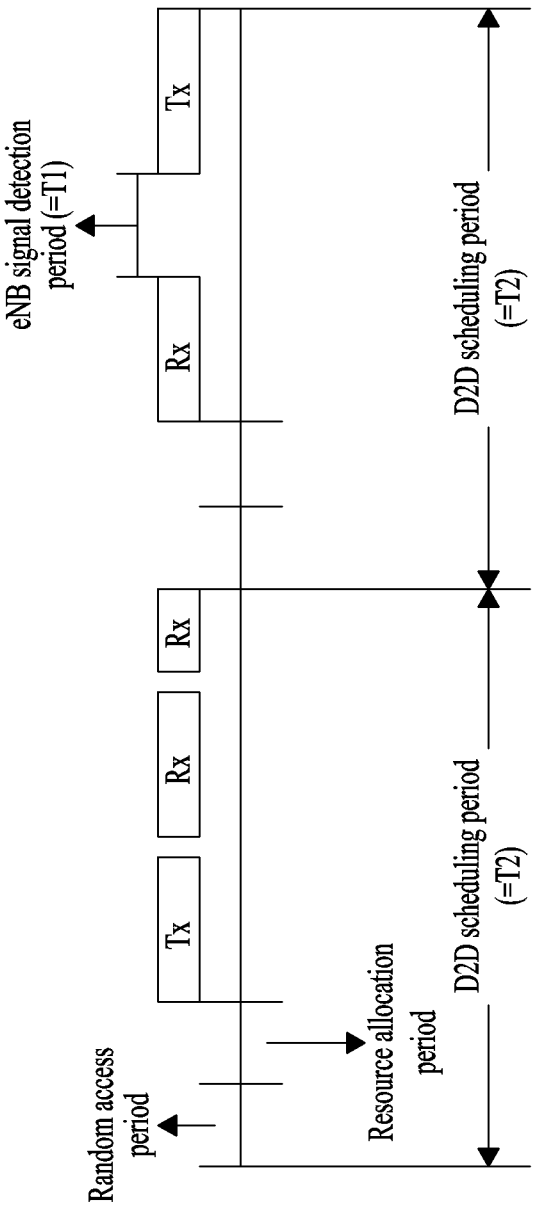
FIG. 9 illustrates an example of scheduling a specific D2D UE according to an embodiment of the present invention.

FIG. 9 illustrates an example of scheduling a specific D2D UE according to an embodiment of the present invention. In particular, FIG. 9 assumes that D2D scheduling is interrupted once for a time T2 within two D2D scheduling periods, and assumes that the length of the D2D scheduling period is equal to that of the time T2.

Referring to FIG. 9, since no continuous period in which the corresponding UE does not participate in D2D communication is greater than or equal to T1 in the first D2D scheduling period, eNB signal detection of the corresponding UE is guaranteed by not scheduling D2D transmission/reception for a certain time in the second D2D scheduling period.

This scheduling method is different from method B) below in that an eNB signal detection period is determined based on a scheduling result of the scheduling UE, and is configurable at a different timing per UE.

B) A specific time region of the D2D scheduling period may be allocated as an eNB signal detection region or a D2D communication interruption region to allow all UEs in the cluster to simultaneously interrupt D2D signal transmission/reception and perform eNB signal detection. That is, a specific UE signals a time region in which D2D transmission is interrupted, to peripheral UEs, and the UEs having signaled the same perform D2D transmission only in time regions other than the corresponding region but perform eNB signal detection in the interrupted time region. This method is advantageous in that, when the specific UE performs eNB signal detection, the other UEs do not transmit D2D signals and thus the eNB signal may be detected without interference from another D2D link. UEs belonging to a specific cluster may be configured not to perform any D2D signal transmission operation in a specific time region if the corresponding region is designated as an eNB signal detection region.

Figure 10:
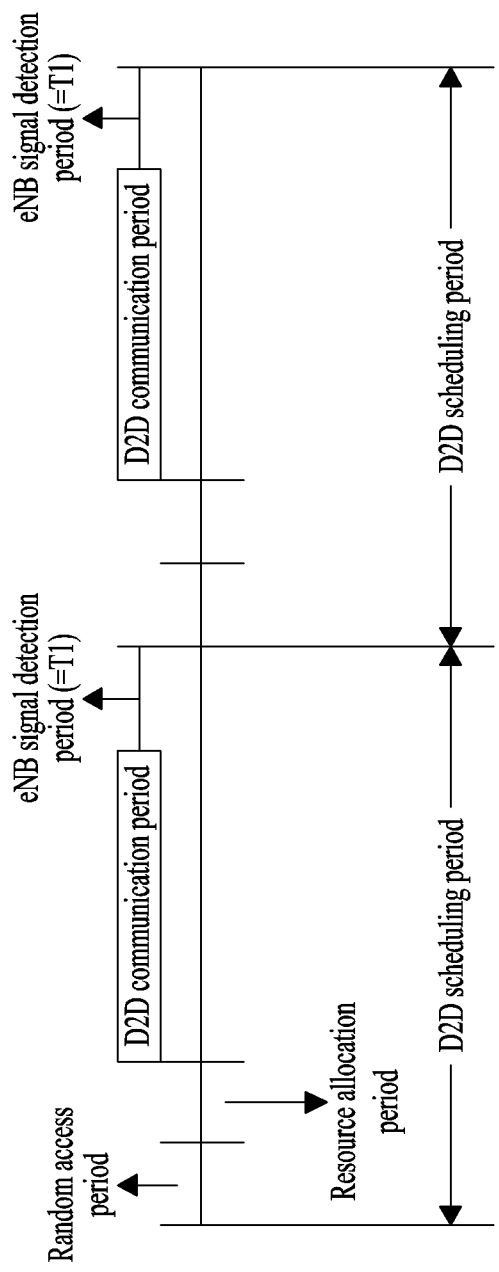
FIGS. 10 and 11 illustrate other examples of scheduling a specific D2D UE.
Figure 11:
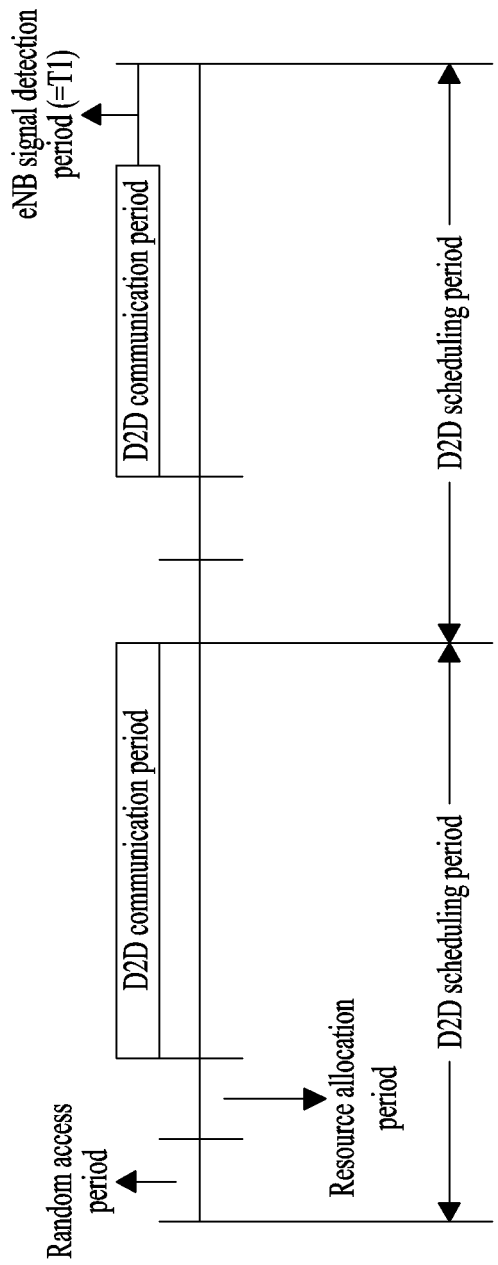

FIGS. 10 and 11 illustrate other examples of scheduling a specific D2D UE.

Specifically, if a scheduling method such as method B) is used, the operation for allocating the time T1 within a specific D2D scheduling period for eNB signal detection may be performed every scheduling period as illustrated in FIG. 10, or performed once within a plurality of scheduling periods as illustrated in FIG. 11 (e.g., once within two scheduling periods in FIG. 11).

In particular, if a D2D scheduling period having an eNB signal detection time region intermittently occurs as illustrated in FIG. 11, each UE needs to check an index of each D2D scheduling period. Accordingly, a certain counter may be defined when reference signals indicating the boundaries of D2D scheduling periods are generated, and a reference signal of an n-th D2D scheduling period may be configured to correspond to a state in which the counter is set to n. If an eNB signal detection period occurs once within N D2D scheduling periods, an operating region of the counter n may be set to 0 to N−1, and the value of the counter is increased by 1 every D2D scheduling period. If the counter has a value of N−1, the eNB signal detection period may occur in a corresponding D2D scheduling period and the counter may be reset to 0.

Additionally, as illustrated in FIG. 11, any D2D transmission/reception operation may not be performed in a D2D scheduling period having the eNB signal detection period, and the whole period may be used only for eNB signal detection. In this case, exceptionally, a reference signal for D2D cluster management and a D2D UE discovery signal may be transmitted and received.

Furthermore, if the eNB signal detection period occurs in a specific D2D scheduling period, the length of a time usable for D2D communication within the corresponding D2D scheduling period may be reduced to achieve the same length of all D2D scheduling periods as illustrated in FIG. 11. Alternatively, the length of the D2D communication time may be constantly maintained and an eNB signal detection time may be added thereafter to allow the corresponding D2D scheduling period to occupy a longer time.

Meanwhile, the eNB signal detection period may be restrictively applied when D2D communication is performed in a frequency band of a TDD system in which a transmission signal of the eNB and a transmission signal of the UE are distinguished in the time domain. This is because, although the UE may continuously detect a signal of the eNB using a DL band even when D2D communication is performed in a UL band in an FDD system in which a transmission signal of the eNB and a transmission signal of the UE are distinguished in the frequency domain, the UE may not easily detect an eNB signal of the same frequency band if D2D operation is performed at a specific timing in the TDD system. This means a UE belonging to and scheduled in a specific cluster should check a duplex mode used by the eNB, i.e., the FDD system or the TDD system, via the scheduling UE.

In this case, information about the duplex mode may be included in a reference signal transmitted to select the scheduling UE. To this end, a seed value for generating the reference signal may be set differently based on the duplex mode. Alternatively, the reference signal may include an indicator indicating a duplex mode used by the scheduling UE, or the scheduling UE may signal information indicating a time region where D2D communication is interrupted, i.e., an eNB signal detection time region, using a seed value of the transmitted reference signal or a certain indicator transmitted together with the reference signal.

In addition, operation of the eNB signal detection period is not limited to the above-described detailed configurations of the D2D scheduling period, e.g., the configurations of the random access period and the resource allocation period. For example, when D2D signals are transmitted and received, D2D signal transmission/reception may be interrupted at least once for a certain time within a certain period to guarantee a time region for attempting eNB signal detection.

Additionally, a period in which D2D communication is interrupted to detect a signal from the eNB may be used to avoid interference from other D2D UEs as well as to perform eNB signal detection. For example, in the TDD system, a signal transmitted for D2D communication by a UE outside the coverage of the eNB may serve as strong interference in receiving a DL signal from the eNB by a UE within the coverage. In this case, if D2D communication is interrupted in the D2D communication interrupted period, the operation for receiving a critical DL signal from the eNB by the UE within the coverage of the eNB may be guaranteed.

Figure 12:
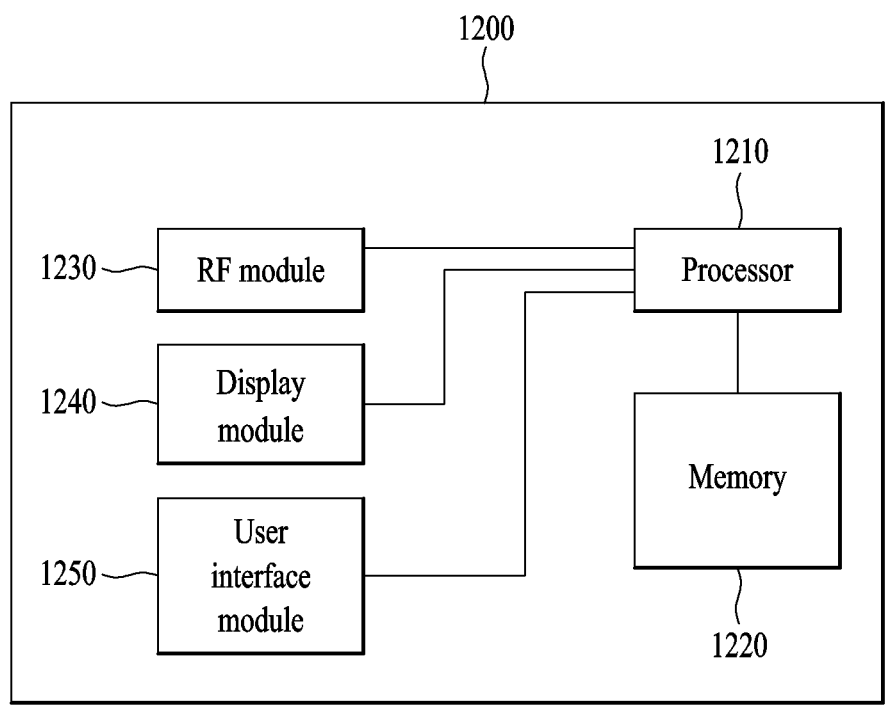
FIG. 12 is a block diagram of a communication apparatus according to an embodiment of the present invention.

FIG. 12 is a block diagram for an example of a communication device according to one embodiment of the present invention.

Referring to FIG. 12, a communication device 1200 may include a processor 1210, a memory 1220, an RF module 1230, a display module 1240, and a user interface module 1250.

Since the communication device 1200 is depicted for clarity of description, prescribed module(s) may be omitted in part. The communication device 1200 may further include necessary module(s). And, a prescribed module of the communication device 1200 may be divided into subdivided modules. A processor 1210 is configured to perform an operation according to the embodiments of the present invention illustrated with reference to drawings. In particular, the detailed operation of the processor 1210 may refer to the former contents described with reference to FIG. 1 to FIG. 11.

The memory 1220 is connected with the processor 1210 and stores an operating system, applications, program codes, data, and the like. The RF module 1230 is connected with the processor 1210 and then performs a function of converting a baseband signal to a radio signal or a function of converting a radio signal to a baseband signal. To this end, the RF module 1230 performs an analog conversion, amplification, a filtering, and a frequency up conversion, or performs processes inverse to the former processes. The display module 1240 is connected with the processor 1210 and displays various kinds of informations. And, the display module 1240 can be implemented using such a well-known component as an LCD (liquid crystal display), an LED (light emitting diode), an OLED (organic light emitting diode) display and the like, by which the present invention may be non-limited. The user interface module 1250 is connected with the processor 1210 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a scheduling method for D2D communication in a wireless communication system, and an apparatus therefor according to the present invention are applied to a 3GPP LTE system in the above description, the method and apparatus are also applicable to a variety of wireless communication systems other than the 3GPP LTE system.

The invention claimed is:

1. A method for supporting device-to-device (D2D) communication by a user equipment (UE) in a wireless communication system, the method comprising:
   transmitting a reference signal in every candidate time location when a value of a generated random number at every candidate time location is larger than a reference value; and
   determining that the UE is a scheduling UE, when the UE transmits the reference signal prior to respective peer UEs,
   wherein, when the UE is determined as the scheduling UE, the method further comprises:
      receiving random access signals from the respective peer UEs in a random access period;
      allocating resources for the respective peer UEs using scheduling information comprised by the random access signals; and
      transmitting information about the resources allocated for the respective peer UEs through respective different sub-periods included in a resource allocation period, and
   wherein a position of the respective different sub-periods through which the UE transmits the information about the resources allocated for the respective peer UEs corresponds to a position of the allocated resources to the respective peer UEs among a plurality of resource units which appear after the resource allocation period.

2. The method according to claim 1, wherein the random access signals are generated based on at least one of UE identifiers (IDs) of the respective peer UEs, the amounts of traffic to be transmitted by the respective peer UEs through the D2D communication, and UE identifiers of target UEs of the D2D communication.

3. The method according to claim 1, wherein the random access period is divided into a plurality of random access sub-periods, and wherein each of the respective peer UEs transmits the random access signal in a corresponding random access sub-period.

4. The method according to claim 1,
wherein one time unit for the D2D communication comprises the random access period, the resource allocation period, and a period for performing the D2D communication, and
wherein one time unit for the D2D communication comprises a period in which the D2D communication is interrupted.

5. The method according to claim 1, wherein the transmitting of the information about the allocated resources to the peer UEs comprises repeatedly transmitting the random access signals received from the respective peer UEs.

6. The method according to claim 1, wherein the reference signal comprises information about a subframe boundary corresponding to the UE.

7. A user equipment (UE) for supporting device-to-device (D2D) communication in a wireless communication system, the UE comprising:
a transceiver; and
a processor configured to:
control the transceiver to transmit and receive signals to and from a base station (BS) or one or more peer UEs,
control the transceiver to transmit a reference signal in every candidate time location when a value of a generated random number at every candidate time location is greater than a reference value, and
determine that the UE is a scheduling UE, when the UE transmits the reference signal prior to respective peer UEs,
wherein, when the UE is determined as the scheduling UE, the processor is further configured to:
control the transceiver to receive random access signals from the respective peer UEs in a random access period,
allocate resources for the respective peer UEs using scheduling information comprised by the random access signals, and
control the transceiver to transmit information about the resources allocated for the respective peer UEs through respective different sub-periods included in a resource allocation period, and
wherein a position of the respective different sub-periods through which the transceiver transmits the information about the resources allocated for the respective peer UEs corresponds to a position of the allocated resources to the respective peer UEs among a plurality of resource units which appear after the resource allocation period.

8. The UE according to claim 7, wherein the random access signals are generated based on at least one of UE identifiers (IDs) of the respective peer UEs, the amounts of traffic to be transmitted by the respective peer UEs through the D2D communication, and UE identifiers of target UEs of the D2D communication.

9. The UE according to claim 7, wherein the random access period is divided into a plurality of random access sub-periods, and
wherein each of the respective peer UEs transmits the random access signal in a corresponding random access sub-period.

10. The UE according to claim 7,
wherein one time unit for the D2D communication comprises the random access period, the resource allocation period, and a period for performing the D2D communication, and
wherein one time unit for the D2D communication comprises a period in which the D2D communication is interrupted.

11. The UE according to claim 7, wherein the processor controls the transceiver to repeatedly transmit the random access signals received by the transceiver from the respective peer UEs to transmit the information about the allocated resources to the peer UEs.

12. The UE according to claim 7, wherein the reference signal comprises information about a subframe boundary corresponding to the UE.

* * * * *